Jan. 17, 1950 G. PETERSON 2,494,830
MODULATOR CIRCUIT
Filed June 1, 1948
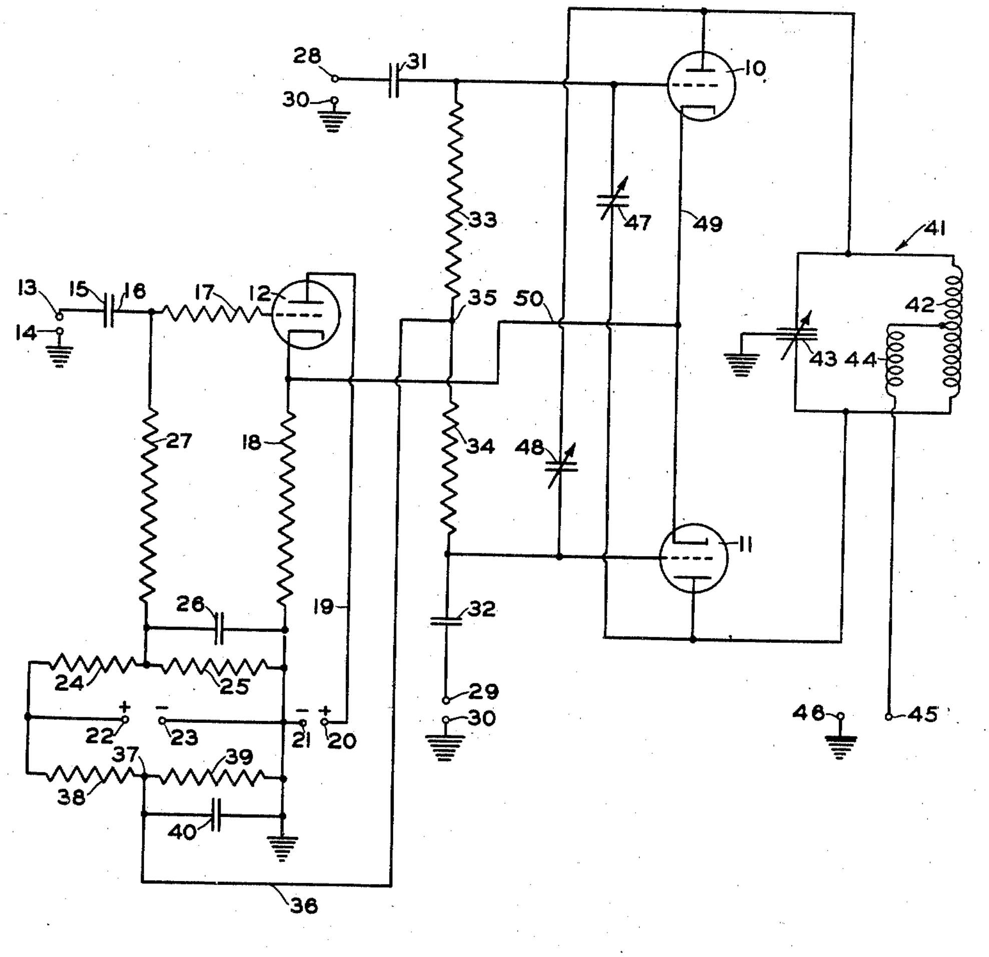
INVENTOR.
GLEN PETERSON
BY Hudson & Young
ATTORNEYS Patented Jan. 17, 1950 2,494,830

UNITED STATES PATENT OFFICE 2,494,830

MODULATOR CIRCUIT

Glen Peterson, Tulsa, Okla., assignor to Phillips Petroleum Company, a corporation of Delaware Application June 1, 1948, Serial No. 30,257

6 Claims. (Cl. 332—63)

This invention relates to modulator circuits for use in radio transmitters.

In radio geophone systems, a number of geophones are provided for picking up seismic disturbances propagated through the earth and converting these seismic disturbances into electrical voltages representative thereof. A transmitter is provided at each geophone station and the radio frequency output of the transmitter is modulated by the electrical voltages produced by the associated geophone. The alternating voltages produced by the geophones have very low frequencies in the range of 10 cycles per second, for example. At such low frequencies, ordinary plate modulation circuits require the use of a choke or transformer of such great weight and size as to seriously curtail the flexibility of the system. In addition, such a transformer is extremely expensive since the radio geophone system requires the use of substantial amounts of power with a very small percentage of distortion. Grid modulation is also unsatisfactory at such low frequencies since the modulation percentage must be very small if the distortion is to be maintained sufficiently low. This requires the use of expensive and cumbersome low frequency amplifiers utilizing many stages of amplification.

It is an object of my invention to eliminate the problems encountered with prior art modulation systems, especially when operated at very low modulating frequencies.

It is a further object of the invention to provide high-percentage low-frequency amplitude modulation at relatively large power outputs with the use of small, inexpensive components.

It is a still further object of the invention to provide such amplitude modulation with little or no distortion.

Various other objects, advantages and features of the invention will become apparent from the following detailed description taken in conjunction with the accompanying drawing, in which:

The figure is a schematic circuit diagram of my novel modulator circuit.

Referring now to the drawing in detail, the modulator circuit includes a pair of radio frequency amplifier tubes 10 and 11 connected in push-pull circuit arrangement and having their cathodes modulated by the output of a low frequency amplifier tube 12. Each of these tubes has an anode, a cathode and a control grid although, in some applications, the tubes may have more electrodes as will be readily apparent to those skilled in the art.

A low frequency signal is applied to terminals 13 and 14 from a suitable amplifier or other source of low frequency current, not shown. Terminal 14 is grounded and terminal 13 is connected through a condenser 15, a conductor 16, and an impedance or resistor 17 to the control grid of modulator tube 12. The cathode of the modulator tube is connected to ground through a load impedance 18 and the anode of the tube is connected by a lead 19 to a positive terminal 20 of a suitable power supply, the negative terminal 21 of which is grounded. The impedance 18 preferably includes a large inductance which, unavoidably, has a large resistance component and the voltage drop produced across this impedance by the flow of anode current therethrough establishes a positive potential or bias upon the cathode of the modulator tube. That is, the cathode of modulator tube 12 has a positive potential with respect to ground and the negative terminal 21 of the power supply.

In order that the signal impressed upon the control grid may control the anode current flowing through the tube, a positive bias is applied to the control grid so that it is maintained at approximately the same potential as the cathode. To this end, I provide a source of bias potential having a positive terminal 22 and a negative terminal 23, this current source being shunted by a voltage divider network consisting of two series connected resistors 24 and 25, the resistor 25 being shunted, in turn, by a large by-pass condenser 26. A grid leak 27 is connected between conductor 16 and the junction between resistors 24, 25 with the result that the bias source is effective through the network 24 and 25, resistor 27, and impedance 17 to maintain the control grid at a positive potential approximately equal to the positive potential produced on the cathode by the current flowing through load impedance 18.

In order to obtain the largest possible output from the tube 12, an input signal of sufficient magnitude is applied to the control grid as to drive it near cut-off on the negative half cycles and into the positive grid region on the positive half cycles. The described resistance network prevents the resultant flow of grid current during the positive half cycles from appreciably distorting the output of the modulator tube. In this connection, it will be noted that a current flows through resistors 17, 18, 25, and 27 when the control grid of tube 12 becomes positive and that this current flows through resistor 25 in opposite direction to the current flow produced by the bias source 22 and 23. The resultant voltages of opposite polarity appearing across resistor 25 tend to neutralize each other and thereby maintain the control grid at approximately the same potential as the cathode. This is especially true where the ohmic values of the resistors 24 and 25 are in a predetermined ratio, as set forth in the following equation:

$$R_2=\frac{E_g}{E_c-E_g}R_1$$

where $R_1$ represents the ohmic value of resistor 24; $R_2$ represents the ohmic value of resistor 25; $E_c$ represents the voltage developed by the source 22 and 23; and $E_g$ represents the maximum equivalent direct current voltage impressed upon the control grid due to grid current.

The regulation of the bias potentials applied to the tube 12 in the manner described results in the appearance of a large undistorted power output across the cathode load impedance 18. This undistorted output is utilized to modulate the radio frequency amplifier tubes 10 and 11. The radio frequency amplifier circuit comprises two sets 28, 30 and 29, 30 of input terminals through which radio frequency energy is fed from a preceding oscillator or amplifier unit to the tubes 10 and 11. The terminals 30 are grounded while the terminals 28 and 29 are connected, respectively, through coupling condensers 31 and 32 to the control grids of tubes 10 and 11. A pair of grid impedances 33, 34 of equal ohmic value have a common terminal 35 and their other terminals are connected, respectively, to the control grids of tubes 10 and 11. The common terminal 35 is connected by a lead 36 to the junction 37 of a pair of series connected resistances 38, 39 which form a voltage divider network shunted across the bias source 22 and 23, the resistor 39 being shunted, in turn, by a large by-pass condenser 40. The action of this voltage divider network is similar to the action of the previously described network 24 and 25.

The anodes of tubes 10 and 11 are connected to the respective terminals of a tank circuit 41 which includes an inductance 42 shunted by a tuning condenser 43. The center tap of inductance 42 is connected through a choke 44 to a positive terminal 45 of a power supply, the negative terminal 46 of which is grounded. If desired, the same power supply may feed current to terminals 22, 23 and 45, 46. A neutralizing condenser 47 interconnects the anode of tube 11 and the control grid of tube 10 while a neutralizing condenser 48 interconnects the anode of tube 10 and the control grid of tube 11.

In accordance with the invention, the cathodes of the amplifier tubes are interconnected by a wire 49, a branch 50 of which is connected to the cathode of modulator tube 12. In this manner, the input impedance of the modulated amplifier tubes 10 and 11 forms a part of the load impedance of the cathode follower modulator tube 12. The load impedances 33 and 34 are so constructed that they function as radio frequency chokes and the bias resistor 39 is by-passed by a large condenser which offers substantially no impedance to the modulating signals. As a result, there are no circuit components in the input portion of the amplifier circuit which offer appreciable impedance to the modulating signals, except the true input resistance of the tubes. This causes 100 per cent degeneration of the modulating signal. Consequently, no distortion results from the modulation of the radio frequency signal applied to the tubes 10 and 11 by the low frequency signals appearing across the load impedance 18 and the envelope of the radiated wave is an exact duplicate of the modulating voltage wave applied to the grid of modulator 12.

Preferably and advantageously, the load impedance 18 consists of an inductance and a resistance connected in series and the ohmic values of these components are such that the total impedance of the unit 18 is equal to the combined input impedance of the amplifier tubes 10 and 11 as well as to the plate resistance of the modulator tube 12. Where this condition exists, the modulated signal is exceptionally free from distortion and there is a high percentage of modulation.

In some cases, a large by-pass condenser may be inserted into the lead 50 thereby permitting a complete separation of the grid bias of the modulator tube 12 from that of the amplifier tubes 10 and 11. In the circuit shown, the potential at the cathodes of tubes 10 and 11 varies relative to both the control grids and anodes of these tubes as the modulating signal is applied to the cathodes. Accordingly, in this embodiment, both grid and anode modulation are used in impressing low frequency components upon the radio frequency signal. In some cases, it may be desirable to interconnect conductors 35 and 50, while eliminating conductor 36, with the result that the grid potential of tubes 10 and 11 varies in the same manner as the cathode potential. In this embodiment, the modulation is effected by varying the potentials of the control grid and cathode with respect to the potential of the anode and there is no change in the grid-cathode potential resulting from the modulating signal. Thus, no grid modulation is effected and the circuit operates as an anode modulator circuit. The same conditions prevail if a large by-pass condenser is connected between conductors 35 and 50 provided that the impedances 33, 34 are radio frequency chokes which offer little or no impedance to the low frequency modulating signal. In certain applications, one of the tubes 10, 11 may be omitted and the modulator may feed a single ended radio frequency amplifier circuit. However, the push-pull circuit is greatly superior, particularly at the frequencies used in radio seismic work.

From the foregoing description, it will be apparent that I have provided a modulator circuit for efficiently obtaining the objects of my invention. Thus, I have provided means for obtaining a large undistorted output by utilizing a cathode follower modulator circuit in which a positive bias is applied to the modulator grid to maintain it at approximately the same potential as the cathode, and this bias is regulated so as to minimize the effects of the flow of grid current when the modulator grid becomes positive with respect to its cathode. In addition, I have provided a circuit wherein the modulating signal is 100 per cent degenerated with resultant low distortion and wherein the input impedance of the amplifier stage is matched by the output impedance of the modulator stage which is connected in the cathode circuit of the modulator tube. In addition, I have disclosed alternative circuits whereby the radio frequency output of the amplifier can be either anode modulated or anode and grid modulated.

While the invention has been described in connection with present, preferred embodiment thereof, it is to be understood that this description is illustrative only and is not intended to limit the invention, the scope of which is defined by the appended claims.

Having described my invention, I claim:

1. A modulator circuit comprising a modulator tube having an anode, a cathode, and a control grid, a load impedance having one terminal thereof connected to said cathode, means for impressing anode voltage between the other terminal of said impedance and said anode, means for impressing a low frequency signal on said control grid, a radio frequency amplifier unit including two tubes connected in push-pull circuit arrangement, each amplifier tube having an anode, a cathode, and a control grid, means for feeding radio frequency energy to both of the amplifier control grids, an output circuit including a tuned circuit and the anodes of both amplifier tubes, means for impressing anode voltage between the cathodes of said amplifier tubes and said output circuit, and a conductor connecting the cathode of said modulator tube to the cathodes of both amplifier tubes.

2. A modulator circuit comprising a modulator tube having an anode, a cathode, and a control grid, a load impedance having one terminal thereof connected to said cathode, means for impressing anode voltage between the other terminal of said impedance and said anode whereby a positive bias is impressed on said cathode, means for applying a positive bias to said control grid to maintain it at approximately the same potential as said cathode, means for impressing a low frequency signal on said control grid, a radio frequency amplifier unit including two tubes connected in push-pull circuit arrangement, each amplifier tube having an anode, a cathode, and a control grid, means for feeding radio frequency energy to both of said control grids, an output circuit including a tuned circuit and the anodes of both amplifier tubes, means for impressing anode voltage between the cathodes of said amplifier tubes and said output circuit, and a conductor connecting the cathode of said modulator tube to the cathodes of both amplifier tubes.

3. A modulator circuit comprising a modulator tube having an anode, a cathode, and a control grid, a load impedance having one terminal thereof connected to said cathode, means for impressing anode voltage between the other terminal of said impedance and said anode whereby a positive bias is impressed on said cathode, an input circuit including a resistance network for impressing a low frequency signal upon said control grid, a source of bias potential connected in circuit with a portion of said resistance network to apply a positive bias to said control grid to maintain it at approximately the same potential as said cathode, a radio frequency amplifier unit including two tubes connected in push-pull circuit arrangement, each amplifier tube having an anode, a cathode, and a control grid, means for feeding radio frequency energy to both of said control grids, an output circuit including a tuned circuit and the anodes of both amplifier tubes, means for impressing anode voltage between the cathodes of said amplifier tubes and said output circuit, and a conductor connecting the cathode of said modulator tube to the cathodes of both amplifier tubes.

4. A modulator circuit comprising a modulator tube having an anode, a cathode, and a control grid, a load impedance having one terminal thereof connected to said cathode and the other terminal thereof connected to ground, means for impressing anode voltage between the grounded terminal of said impedance and said anode whereby a positive bias is impressed on said cathode, a resistor connecting said control grid to a source of low frequency energy, a grid leak resistor having one terminal thereof connected to said source of low frequency energy and the other terminal thereof connected to a grounded voltage dropping resistor, a source of bias voltage having a grounded negative terminal, a second voltage dropping resistor connected between the positive terminal of said source and said other terminal of the grid leak resistor, whereby current from said bias source tends to impress a voltage of one polarity across said first voltage dropping resistor and grid current flowing through said tube tends to impress a voltage of opposite polarity across said first voltage dropping resistor, the ohmic values of said voltage dropping resistors being such that said voltages of opposite polarity tend to neutralize each other and maintain the control grid at approximately the same potential as said cathode, a radio frequency amplifier unit including two tubes connected in push-pull circuit arrangement, each amplifier tube having an anode, a cathode, and a control grid, means for feeding radio frequency energy to both of said control grids, an output circuit including a tuned circuit and the anodes of both amplifier tubes, means for impressing anode voltage between the cathodes of said amplifier tubes and said output circuit, and a conductor connecting the cathode of said modulator tube to the cathodes of both amplifier tubes.

5. A modulator circuit comprising a modulator tube having an anode, a cathode, and a control grid, a load impedance having one terminal thereof connected to said cathode, means for impressing anode voltage between the other terminal of said impedance and said anode whereby a positive bias is impressed on said cathode, an input circuit including a resistance network for impressing a low frequency signal upon said control grid, a source of bias potential connected in circuit with a portion of said resistance network to apply a positive bias to said control grid to maintain it at approximately the same potential as said cathode, a radio frequency amplifier unit including two tubes connected in push-pull circuit arrangement, each amplifier tube having an anode, a cathode, and a control grid, a pair of load impedances having a common terminal and having their other terminals connected to the respective amplifier control grids, a bias resistor connected between said common terminal and said other terminal of the modulator load impedance, means for feeding radio frequency energy to both of said amplifier control grids, an output circuit including a tuned circuit and the anodes of both amplifier tubes, means for impressing anode voltage between said bias resistor and said output circuit, and a conductor connecting the cathode of said modulator tube to the cathodes of both amplifier tubes.

6. A modulator circuit comprising a modulator tube having an anode, a cathode, and a control grid, a load impedance having one terminal thereof connected to said cathode, means for impressing anode voltage between the other terminal of said impedance and said anode whereby a positive bias is impressed on said cathode, an input circuit including a resistance network for impressing a low frequency signal upon said control grid, a source of bias potential connected in circuit with a portion of said resistance network to apply a positive bias to said control grid to maintain it at approximately the same potential as said cathode, a radio frequency amplifier unit including two tubes connected in push-pull circuit arrangement, each amplifier tube having an anode, a cathode, and a control grid, a conductor interconnecting the cathodes of said amplifier tubes, an impedance connected between said conductor and each of the amplifier control grids, means for feeding radio frequency energy to both of said control grids, an output circuit including a tuned circuit and the anodes of both amplifier tubes, means for impressing anode voltage between the cathodes of said amplifier tubes and said output circuit, and a conductor connecting the cathode of said modulator tube to the cathodes of both amplifier tubes.

GLEN PETERSON.

REFERENCES CITED

The following references are of record in the file of this patent:

UNITED STATES PATENTS

| Number | Name | Date |
| --- | --- | --- |
| 2,432,720 | Brown | Dec. 16, 1947 |